US010361890B2

(12) United States Patent
Arnal et al.

(10) Patent No.: US 10,361,890 B2
(45) Date of Patent: *Jul. 23, 2019

(54) TRANSMISSION AND RECEPTION METHODS FOR A BINARY SIGNAL ON A SERIAL LINK

(71) Applicant: STMicroelectronics (Rousset) SAS, Rousset (FR)

(72) Inventors: Christophe Arnal, St Vallier de Thiey (FR); Roland Van Der Tuijn, Mouans-Sartoux (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/157,428

(22) Filed: Oct. 11, 2018

(65) Prior Publication Data

US 2019/0044758 A1 Feb. 7, 2019

Related U.S. Application Data

(63) Continuation of application No. 14/853,520, filed on Sep. 14, 2015, now Pat. No. 10,122,552.

(30) Foreign Application Priority Data

Dec. 4, 2014 (FR) ...................... 14 61892

(51) Int. Cl.
*H04L 7/06* (2006.01)
*H04L 25/02* (2006.01)
(Continued)

(52) U.S. Cl.
CPC ...... *H04L 25/0262* (2013.01); *G06F 13/4081* (2013.01); *H04B 10/0795* (2013.01)

(58) Field of Classification Search
CPC ... H03K 7/08; H04L 25/4902; H04L 25/0262; H03F 3/217; H03F 2200/351; G06F 1/025; G06F 13/4081; H04B 10/0795
(Continued)

(56) References Cited

U.S. PATENT DOCUMENTS 4,133,978 A * 1/1979 Hewlett, Jr. ............ H04L 7/08
370/504
4,797,591 A 1/1989 Duxbury et al.
(Continued)

OTHER PUBLICATIONS

"Manchester Coding Basics," Atmel Corporation, Application Note, Sep. 2009, 24 pages.

(Continued)

*Primary Examiner* — James M Perez
(74) *Attorney, Agent, or Firm* — Slater Matsil, LLP

(57) ABSTRACT

A method can be used for transmission of at least one packet of at least one bit over a serial link capable of taking two different states respectively associated with the two possible logical values of the at least one transmitted bit. Starting from a transmission start time of the at least one bit and up to the expiration of a first portion of a bit time associated with the at least one bit, the link is placed in one of its states depending on the logical value of the at least one bit. Upon the expiration of the first portion of this bit time, a first additional transition is generated over the link so as to place the link in its other state up to the expiration of the bit time.

23 Claims, 5 Drawing Sheets

(51) Int. Cl.
*H04B 10/079* (2013.01)
*G06F 13/40* (2006.01)

(58) Field of Classification Search
USPC .......................................... 375/238, 354–376
See application file for complete search history.

(56) References Cited

U.S. PATENT DOCUMENTS

| | | | | |
|---|---|---|---|---|
| 4,797,951 A * | 1/1989 | Duxbury | H04J 3/0626 | 375/260 |
| 4,841,549 A * | 6/1989 | Knapp | H04J 3/0614 | 375/362 |
| 4,888,791 A * | 12/1989 | Barndt, Sr. | H04L 7/033 | 375/239 |
| 5,185,765 A * | 2/1993 | Walker | H04L 27/2035 | 329/312 |
| 5,315,299 A * | 5/1994 | Matsumoto | H03M 5/145 | 341/53 |
| 5,459,751 A * | 10/1995 | Okamoto | H03K 9/00 | 341/178 |
| 5,473,633 A * | 12/1995 | Fischer | B64G 1/26 | 327/31 |
| 5,499,247 A * | 3/1996 | Matsuda | H04L 1/0057 | 370/445 |
| 5,504,757 A * | 4/1996 | Cook | H04L 12/40078 | 370/468 |
| 5,588,023 A * | 12/1996 | Ho | H04L 27/30 | 341/53 |
| 5,623,522 A * | 4/1997 | Ito | H04L 25/40 | 370/305 |
| 5,654,983 A * | 8/1997 | Sauser, Jr. | H04L 25/0262 | 375/225 |
| 5,657,347 A * | 8/1997 | Mori | H04L 7/044 | 375/225 |
| 5,661,736 A * | 8/1997 | Sferrazza | H04L 7/0008 | 714/55 |
| 5,696,790 A * | 12/1997 | Graham | G06F 1/025 | 375/238 |
| 5,740,199 A * | 4/1998 | Sibigtroth | H04L 5/16 | 370/212 |
| 5,774,452 A * | 6/1998 | Wolosewicz | H04H 20/31 | 370/212 |
| 5,787,132 A * | 7/1998 | Kishigami | H04L 7/042 | 370/304 |
| 5,790,607 A * | 8/1998 | Burke | H04L 7/0334 | 370/503 |
| 5,878,079 A * | 3/1999 | Mori | H04L 7/044 | 375/225 |
| 5,903,607 A * | 5/1999 | Tailliet | H04B 3/548 | 340/12.37 |
| 5,963,194 A * | 10/1999 | Umeda | G01S 3/784 | 345/157 |
| 6,018,513 A * | 1/2000 | Okamoto | H04L 12/40013 | 340/12.16 |
| 6,028,849 A * | 2/2000 | Niot | H04B 7/2671 | 370/280 |
| 6,064,697 A * | 5/2000 | Yoshikawa | H03M 5/145 | 375/242 |
| 6,084,797 A * | 7/2000 | Maloberti | G11C 11/5621 | 365/185.2 |
| 6,163,586 A * | 12/2000 | Hongbin Hao | H04L 1/14 | 375/225 |
| 6,181,741 B1 * | 1/2001 | Nakanishi | G08C 19/28 | 370/205 |
| 6,321,982 B1 * | 11/2001 | Gaultier | G06K 7/0008 | 235/375 |
| 6,336,181 B1 * | 1/2002 | Fuzisawa | G06F 13/385 | 710/71 |
| 6,351,489 B1 * | 2/2002 | Tetzlaff | G06F 13/4072 | 327/35 |
| 6,366,125 B1 * | 4/2002 | Rochard | H03K 5/12 | 326/82 |
| 6,385,210 B1 * | 5/2002 | Overberg | H04L 12/413 | 370/447 |
| 6,393,502 B1 * | 5/2002 | Meyer | G06F 13/4059 | 365/221 |
| 6,493,260 B2 * | 12/2002 | Micheloni | G11C 11/5621 | 365/185.03 |
| 6,560,279 B1 * | 5/2003 | Renz | G08C 19/22 | 340/12.16 |
| 6,775,324 B1 * | 8/2004 | Mohan | G11B 20/1411 | 329/312 |
| 6,864,712 B2 * | 3/2005 | Agarwal | G11C 11/4125 | 326/101 |
| 6,873,642 B1 * | 3/2005 | Fey | H04L 25/493 | 375/238 |
| 6,944,248 B2 * | 9/2005 | Sullivan | H04L 25/0262 | 375/225 |
| 7,058,149 B2 * | 6/2006 | Pigott | G04R 40/04 | 375/354 |
| 7,272,059 B2 * | 9/2007 | Vimercati | G11C 7/067 | 365/196 |
| 7,333,536 B2 * | 2/2008 | Sinha | H04L 25/0262 | 375/225 |
| 7,336,706 B2 * | 2/2008 | Krafft | H03K 5/1252 | 375/219 |
| 7,353,442 B2 * | 4/2008 | Bahl | G11C 29/006 | 365/201 |
| 7,363,129 B1 * | 4/2008 | Barnicle | G08C 17/02 | 701/1 |
| 7,415,079 B2 * | 8/2008 | Cameron | H03M 13/1102 | 375/340 |
| 7,418,031 B2 * | 8/2008 | Jha | H04L 43/00 | 370/232 |
| 7,426,123 B2 * | 9/2008 | Leung | H02M 3/33515 | 323/283 |
| 7,729,427 B2 * | 6/2010 | Kwok | H04B 3/542 | 326/30 |
| 7,787,576 B2 * | 8/2010 | Foerster | G01R 13/0254 | 370/498 |
| 7,864,078 B2 * | 1/2011 | Rohatschek | H04L 7/0331 | 341/51 |
| 8,044,743 B2 * | 10/2011 | Greiss | H03F 3/217 | 330/10 |
| 8,201,411 B2 | 6/2012 | Feher | | |
| 8,275,080 B2 * | 9/2012 | Jordan | H04B 1/707 | 375/354 |
| 8,284,830 B2 * | 10/2012 | Lee | H03K 7/08 | 318/599 |
| 8,350,497 B2 * | 1/2013 | Peting | H05B 37/0245 | 315/291 |
| 8,401,394 B2 * | 3/2013 | Walewski | H04B 10/1141 | 375/238 |
| 8,564,365 B2 * | 10/2013 | Dang | H04L 25/4902 | 329/312 |
| 8,581,619 B2 * | 11/2013 | Singh | H04L 25/0278 | 324/601 |
| 8,633,779 B2 * | 1/2014 | Pfaffinger | H03K 7/08 | 332/109 |
| 8,675,742 B2 * | 3/2014 | Zhang | H04L 12/4633 | 375/219 |
| 8,766,955 B2 * | 7/2014 | Loveridge | G09G 5/006 | 345/204 |
| 8,767,777 B2 * | 7/2014 | Kobayashi | G06F 3/14 | 370/276 |
| 8,788,867 B2 * | 7/2014 | Webb, III | G06F 1/0321 | 713/500 |
| 8,850,259 B2 * | 9/2014 | Webb, III | G06F 1/0321 | 713/500 |
| 8,917,804 B2 * | 12/2014 | Sano | H03L 7/0807 | 375/238 |
| 9,106,219 B2 * | 8/2015 | Singh | H04L 25/0278 | |
| 9,129,139 B2 * | 9/2015 | Varone | G06F 21/79 | |
| 9,181,741 B2 | 11/2015 | Bettinzoli | | |
| 9,306,605 B1 * | 4/2016 | Van Der Tuijn | H04B 15/00 | |
| 10,122,552 B2 * | 11/2018 | Arnal | H04L 25/0262 | |
| 10,181,873 B2 * | 1/2019 | Allen | H04B 3/54 | |

(56) References Cited

U.S. PATENT DOCUMENTS

| | | | |
|---|---|---|---|
| 2001/0055311 A1* | 12/2001 | Trachewsky | H04L 1/0003 370/445 |
| 2002/0054504 A1* | 5/2002 | Micheloni | G11C 11/5621 365/185.03 |
| 2002/0071484 A1* | 6/2002 | Spichale | H04L 25/4902 375/238 |
| 2002/0084841 A1* | 7/2002 | Taguchi | B60C 23/0408 329/312 |
| 2002/0101884 A1* | 8/2002 | Pohlmeyer | H04L 7/044 370/509 |
| 2002/0146068 A1* | 10/2002 | Sumitomo | H04L 25/45 375/219 |
| 2002/0172315 A1* | 11/2002 | Sullivan | H04L 25/0262 375/377 |
| 2002/0181578 A1* | 12/2002 | Takano | H03M 5/08 375/238 |
| 2004/0122490 A1* | 6/2004 | Reinke | A61N 1/025 607/60 |
| 2004/0213169 A1* | 10/2004 | Allard | G06K 7/10297 370/276 |
| 2004/0240590 A1* | 12/2004 | Cameron | H03M 13/1102 375/340 |
| 2005/0078745 A1* | 4/2005 | Sinha | H04L 25/0262 375/225 |
| 2005/0246602 A1* | 11/2005 | Bahl | G11C 29/006 714/733 |
| 2005/0286627 A1* | 12/2005 | Tabatabaei | G01R 29/26 375/238 |
| 2005/0286643 A1* | 12/2005 | Ozawa | H03L 7/087 375/242 |
| 2006/0023781 A1* | 2/2006 | Leung | H02M 3/157 375/238 |
| 2006/0245515 A1* | 11/2006 | Tachi | H04L 7/0331 375/293 |
| 2007/0040657 A1* | 2/2007 | Fosler | H02J 1/08 340/333 |
| 2007/0245217 A1* | 10/2007 | Valle | H03M 13/1102 714/758 |
| 2007/0291887 A1* | 12/2007 | Ishimoto | H04L 25/05 375/371 |
| 2008/0049606 A1* | 2/2008 | Rhelimi | H04L 5/1423 370/212 |
| 2008/0095290 A1* | 4/2008 | Leung | H04B 1/406 375/371 |
| 2008/0123730 A1* | 5/2008 | Robinson | H04L 5/16 375/238 |
| 2009/0045773 A1 | 2/2009 | Scherr | |
| 2009/0046773 A1* | 2/2009 | Scherr | H04L 5/1484 375/238 |
| 2009/0141789 A1* | 6/2009 | Warren | H04L 1/1664 375/238 |
| 2009/0185615 A1* | 7/2009 | Someya | G04R 20/10 375/238 |
| 2009/0224719 A1* | 9/2009 | Shimada | H02P 8/14 318/696 |
| 2011/0103275 A1* | 5/2011 | Rhelinni | H04L 25/4902 370/296 |
| 2011/0150065 A1* | 6/2011 | Tailliet | G06F 13/4295 375/224 |
| 2011/0166856 A1* | 7/2011 | Lindahl | G10L 15/20 704/233 |
| 2012/0051241 A1* | 3/2012 | Mori | H04L 12/12 370/252 |
| 2012/0275454 A1* | 11/2012 | Chen | H04L 1/0061 370/389 |
| 2012/0314738 A1* | 12/2012 | Kashima | H04L 12/403 375/219 |
| 2013/0169173 A1* | 7/2013 | Chen | H05B 37/02 315/186 |
| 2013/0336339 A1* | 12/2013 | Valiani | H04L 12/403 370/503 |
| 2014/0036988 A1* | 2/2014 | Kashima | H04L 25/4902 375/238 |
| 2014/0070843 A1* | 3/2014 | Singh | H04L 25/0278 326/30 |
| 2014/0140390 A1* | 5/2014 | Kashima | H04L 25/4902 375/238 |
| 2014/0169419 A1* | 6/2014 | Kashima | H04L 25/4902 375/219 |
| 2014/0169443 A1* | 6/2014 | Karino | H04L 25/4902 375/238 |
| 2014/0241414 A1* | 8/2014 | Reidl | H04L 25/4902 375/238 |
| 2014/0274203 A1* | 9/2014 | Ganong, III | H04W 52/0251 455/556.1 |
| 2014/0358552 A1* | 12/2014 | Xu | G10L 25/78 704/275 |
| 2015/0008967 A1* | 1/2015 | Zhu | H03L 7/0805 327/158 |
| 2015/0131497 A1* | 5/2015 | Arnal | G06F 13/4291 370/282 |
| 2015/0187209 A1* | 7/2015 | Brandt | G08C 19/00 340/12.22 |
| 2015/0236844 A1* | 8/2015 | Pan | H04L 7/0008 370/503 |
| 2016/0036684 A1* | 2/2016 | Jones | H04L 43/50 370/252 |
| 2016/0050089 A1* | 2/2016 | Strasser | H04L 67/10 375/238 |
| 2016/0094312 A1* | 3/2016 | Fredriksson | H04L 12/40 714/807 |
| 2016/0126968 A1* | 5/2016 | Lesso | H03M 1/18 341/155 |
| 2016/0164701 A1* | 6/2016 | Arnal | H04L 25/0262 375/224 |
| 2016/0306409 A1* | 10/2016 | Mori | H04B 1/04 |
| 2017/0139872 A1* | 5/2017 | Ladd | G06F 13/362 |
| 2017/0141604 A1* | 5/2017 | Park | H02J 7/025 |
| 2019/0044758 A1* | 2/2019 | Arnal | H04L 25/0262 |

OTHER PUBLICATIONS

Kartalopoulos, S.V., "Digital Transmission and Coding Techniques," Introduction to DWDM Technology—Data in Rainbow, Chapter 12, Dec. 1999, pp. 167-172.

* cited by examiner

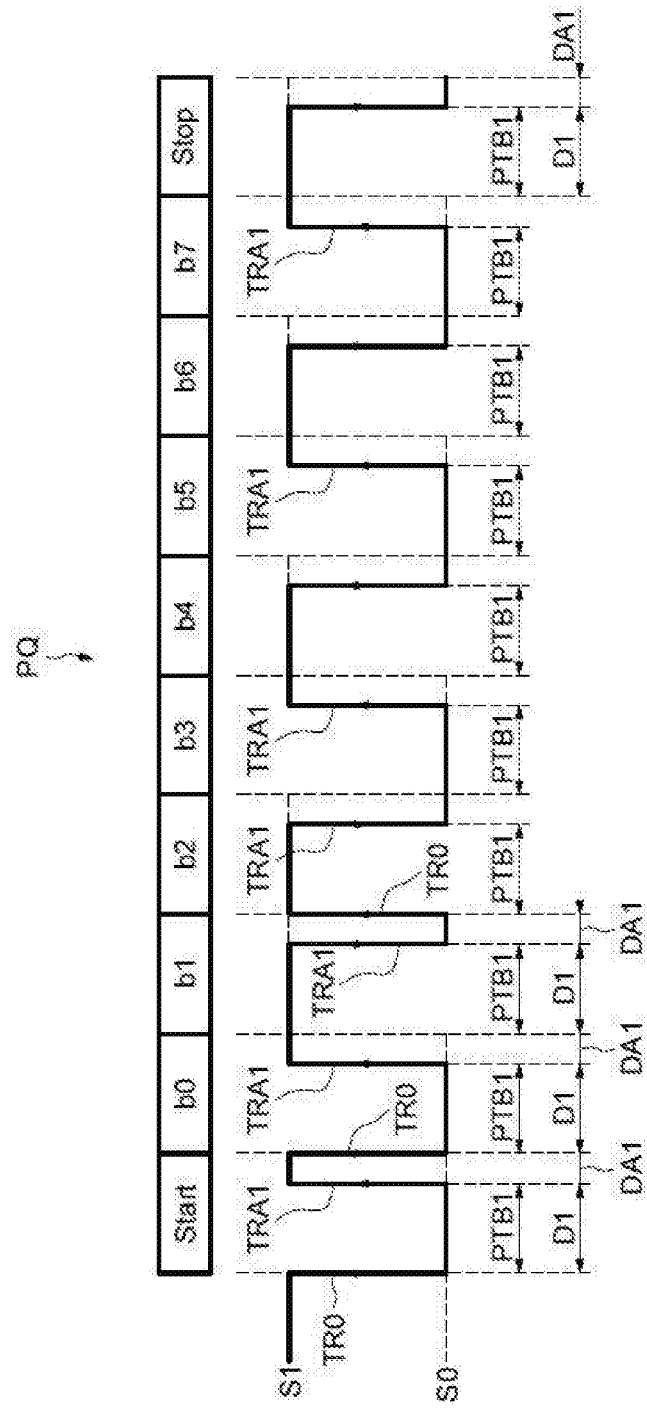

TRANSMISSION AND RECEPTION METHODS FOR A BINARY SIGNAL ON A SERIAL LINK

CROSS-REFERENCE TO RELATED APPLICATIONS

This application is a continuation of U.S. patent application Ser. No. 14/853,520, filed Sep. 14, 2015, which claims priority to French Application No. 1461892, filed on Dec. 4, 2014, which applications are hereby incorporated herein by reference.

TECHNICAL FIELD

Embodiments of the present invention relate to methods for transmission and for receiving a binary signal over a serial link, in particular, for the detection of the speed of transmission or baud rate, and corresponding devices.

BACKGROUND

Each transmitter/receiver in communication must initially define the speed of transmission in order to begin the communication. When the speed of transmission needs to be modified, the communication must be interrupted, protocol messages must be exchanged, and there are often numerous timing constraints to be complied with before interrupting and restarting a communication, in particular when the packets of bits being exchanged are asynchronous, in other words timed by non-synchronized transmission and reception clocks.

The current mechanisms are based on synchronization binary patterns which must firstly be transmitted between the two devices.

The device receiving this synchronization pattern can for example compare it with reference patterns previously stored in a table ("look-up table") so as to deduce from this the real speed of transmission (baud rate).

Aside from the fact that the use of such synchronization patterns requires proprietary protocols, which represents an impediment to the interoperability between devices, this only allows the detection of the speed of transmission for the start of the communication, and furthermore from amongst a predefined set of transmission speeds, and assumes that this speed of transmission will remain constant for the entire duration of the communication.

Moreover, such a solution is completely ineffective when the speed of transmission has to be changed in the course of the communication.

SUMMARY

Various embodiments of the invention relate to the communication of binary information over a serial link capable of taking two different states respectively associated with the two possible logical values of the binary information being communicated, notably the communication of binary information between two universal asynchronous receiver/transmitters known by those skilled in the art under the acronym UART, in particular, with a view to the auto-detection of the speed of transmission at the start of the transmission and/or to a potential modification of this speed of transmission in the course of a communication.

In accordance with a preferred embodiment of the present invention, a method for the speed of transmission or the "baud rate" is generally expressed in bauds which represent the number of symbols transmitted per second (equivalent to the number of bits transmitted per second if each symbol corresponds to a single bit). This data rate allows the value of the bit time, in other words the duration of the time segment used for the transmission of the bit, to be defined.

According to one embodiment and its implementation, methods for transmission and reception are provided that allow, in the receiver, an auto-detection of the speed of transmission at the start of the communication together with an auto-detection of any potential modification of this speed of transmission in the course of the communication.

According to one embodiment and its implementation, in transmission, the idea is to use the final part of the bit time of a bit for generating a transition (or edge) over the link at the end of a portion of this bit time. This transition will be a kind of pre-warning of the imminent expiration of the bit time. Then, in reception, the detection of this transition will allow the receiver, in view of its knowledge of the value of the portion of bit time, to deduce from this the remaining period of time for receiving the current bit and, consequently, the speed of transmission.

Thus, according to one aspect, a method of transmission is provided for at least one packet of at least one bit over a serial link capable of taking two different states respectively associated with the two possible logical values of the at least one transmitted bit; the method comprises a first transmission processing comprising, starting from a transmission start time of the at least one bit and up to the expiration of a first portion of a bit time associated with the at least one bit, the placing of the link in one of its states depending on the logical value of the at least one bit and, upon the expiration of the first portion of this bit time, a generation of a first additional transition over the link so as to place the link in its other state up to the expiration of the bit time.

So as to avoid errors leading to the detection of false bits, it is preferable for the first additional transition to be sufficiently far from the middle of the bit time and from the final end of the bit time. Those skilled in the art will know how to adjust the value of the first portion of bit time as a function notably of the value of the clock signal. However, by way of example, the first portion of the bit time may be in the range between 60% and 90% of the bit time.

In general, the packet comprises several bits. In this case, according to one embodiment, the first transmission processing is implemented at least for the transmission of the first bit and the transmission of the second bit begins at the expiration of the bit time associated with the first bit.

This said, several variants are possible.

Thus, when the bit time associated with the first bit of the packet is longer than the bit time associated with the other bits of the packet and the bit time associated with the other bits of the packet may be determined, by a known relationship, from the bit time associated with the first bit of the packet, the first transmission processing may be implemented only for the transmission of the first bit.

Indeed, when this first bit, for example a bit referred to as "start bit", is sufficiently long, a single transition may be sufficient for detecting, in reception, the speed of transmission and consequently for correctly reading the following bits of the packet.

As a variant, when the bit time associated with all the bits of the packet are identical, or different for some of them but determinable by a known relationship, it is possible of generate additional transitions for the first bit of the packet and for certain other bits of the packet, for example the second and the fourth, which may then be sufficient for detecting, in reception, the speed of transmission with sufficient precision, and consequently for correctly reading the bits of the packet.

Thus, according to one embodiment, the first transmission processing is implemented for the transmission of the first bit and the transmission of at least one other bit of the packet comprises a second transmission processing comprising starting from the transmission start time of the at least one other bit and up to the expiration of a second period counted starting from the transmission start time of the first bit and equal to the sum of all the bit times associated with the bit(s) preceding the at least one other bit and of a second portion of the bit time associated with the at least one other bit, the placing of the link in one of its states depending on the logical value of the at least one other bit, and, upon the expiration of the second period, a generation of a second additional transition over the link so as to place the link in its other state up to the expiration of the bit time associated with the at least one other bit.

As a variant, when the bit time is not identical for all the packets, in other words for example when the speed of transmission changes in the course of the communication, the first transmission processing can be implemented for the transmission of each bit of the packet and the transmission of the current bit, from the second bit up to the last, then begins at the expiration of the bit time associated with the preceding bit.

According to another aspect, a method is provided for reception of at least one packet of at least one bit, carried over a serial link capable of taking two different states respectively associated with the two possible logical values of the at least one received bit, comprising a first reception processing comprising a detection of the occurrence of a first transition between the two states of the link after the reception start time of the at least one bit and a determination of a first period separating the reception start time and the time of occurrence of the first transition, the reception end time of the at least one bit being separated from the time of occurrence of the first transition by a first additional period equal to a first predetermined portion of the first period.

In the same way as the first portion of bit time was for example in the range between 60% and 90% of the bit time in transmission, during the reception, the first predetermined portion can be in the range between 10% and 70% of the first period (which corresponds to a percentage of the bit time in the range between 10% and 40%).

According to one embodiment in which the received packet comprises several bits, the first reception processing is implemented at least for the reception of the first bit, and the reception of the second bit begins at the expiration of the first additional period associated with the first bit.

According to one embodiment in which, when the bit time associated with the first bit of the received packet is longer than the bit time associated with the other bits of the received packet and the bit time associated with the other bits of the received packet may be determined, by a known relationship, from the bit time associated with the first bit of the received packet, the first reception processing may be implemented only for the reception of the first bit.

According to one embodiment in which all the bits of the received packet have the same bit time or have different bit times for some of them but determinable by a known relationship, the first reception processing is implemented for the reception of the first bit and the reception of at least one other bit of the packet comprises a second reception processing comprising a detection of the occurrence of a second transition between the two states of the link after the reception start time of the at least one other bit and a determination of a second period separating the reception start time of the first bit and the time of occurrence of the second transition. The reception end time of the at least one other bit is separated from the time of occurrence of the second transition by a second additional period equal to a second predetermined portion of the second period.

The first portion and the second portion may be identical.

According to one embodiment notably allowing a detection of a change of speed of transmission, potentially at each bit, the first reception processing is implemented for the reception of each bit of the received packet and the reception of the current bit, from the second bit up to the last, begins at the expiration of the additional period associated with the preceding bit.

According to another aspect, a processing unit is provided that is configured for transmitting at least one packet of at least one bit over a serial link capable of taking two different states respectively associated with the two possible logical values of the at least one transmitted bit.

According to one general feature of this other aspect, the processing unit comprises transmission processing unit configured for implementing the transmission method such as defined hereinbefore.

According to another aspect, a processing unit is provided that is configured for receiving at least one packet of at least one bit carried over a serial link capable of taking two different states respectively associated with the two possible logical values of the at least one received bit.

According to one general feature of this other aspect, the processing unit comprises reception processing unit configured for implementing the reception method such as defined hereinbefore.

The processing unit may comprise both a transmission processing unit and a reception processing unit.

Such a processing unit may, for example, be a universal asynchronous receiver/transmitter (UART).

BRIEF DESCRIPTION OF THE DRAWINGS

Other advantages and features of the invention will become apparent upon examining the detailed description of non-limiting embodiments and their implementations, and the appended drawings in which:

FIGS. 1 to 6 illustrate diagrammatically various embodiments of the invention and their implementations.

DETAILED DESCRIPTION OF ILLUSTRATIVE EMBODIMENTS

Figure 1:
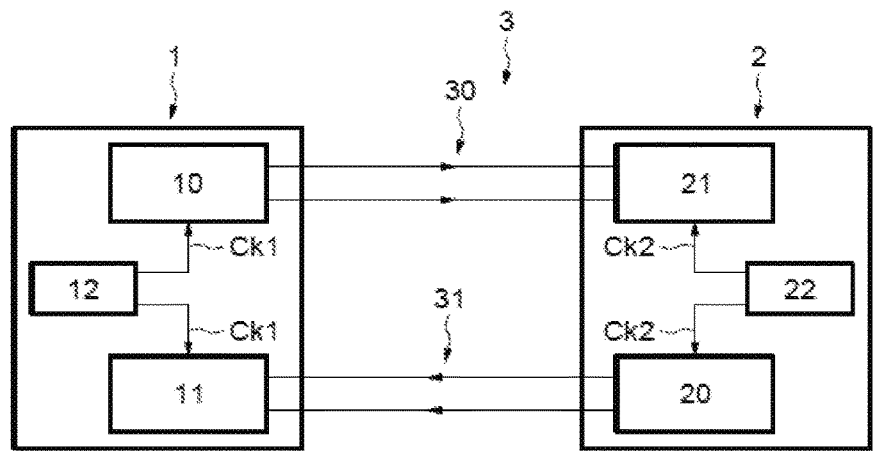

In FIG. 1, the reference 1 represents a processing unit configured for exchanging information, for example bits, in an asynchronous manner, with another processing unit 2, over a serial link 3 here comprising two wires 30 for the transmission from the unit 1 to the unit 2 and two wires 31 for the transmission from the unit 2 to the unit 1.

Each serial link 30, 31 is capable of taking two different states respectively associated with the two possible logical values of the transmitted bits. These two logical states result for example from the difference in potential between the data wire and the ground wire.

The processing unit 1 comprises transmission processing unit 10 and reception processing unit 11. These two units are timed by a clock signal CK1 coming from a generator 12. Similarly, the processing unit 2 comprises transmission processing unit 20 and reception processing unit 21 timed by a clock signal CK2 coming from a generator 22.

The transmission processing units (transmitters) 10, 20 are configured for implementing the transmission method, implementation examples of which will be described with reference to FIGS. 2 and 4 to 6.

Similarly, the reception processing units (receivers) 11, 21 are configured for implementing the reception method of one of the implementation examples which will be described with reference to FIGS. 3 to 6.

For this purpose, the transmission processing units and the transmission and reception processing units comprise elements with a conventional structure, such as for example shift registers and/or any other circuits capable of generating edges over the transmission link depending on the logical values of the bits to be transmitted, and/or any other circuits capable of analyzing the characteristics of the received frame, for example a microcontroller.

The processing units may for example be universal asynchronous receivers/transmitters (UART).

Figure 2:
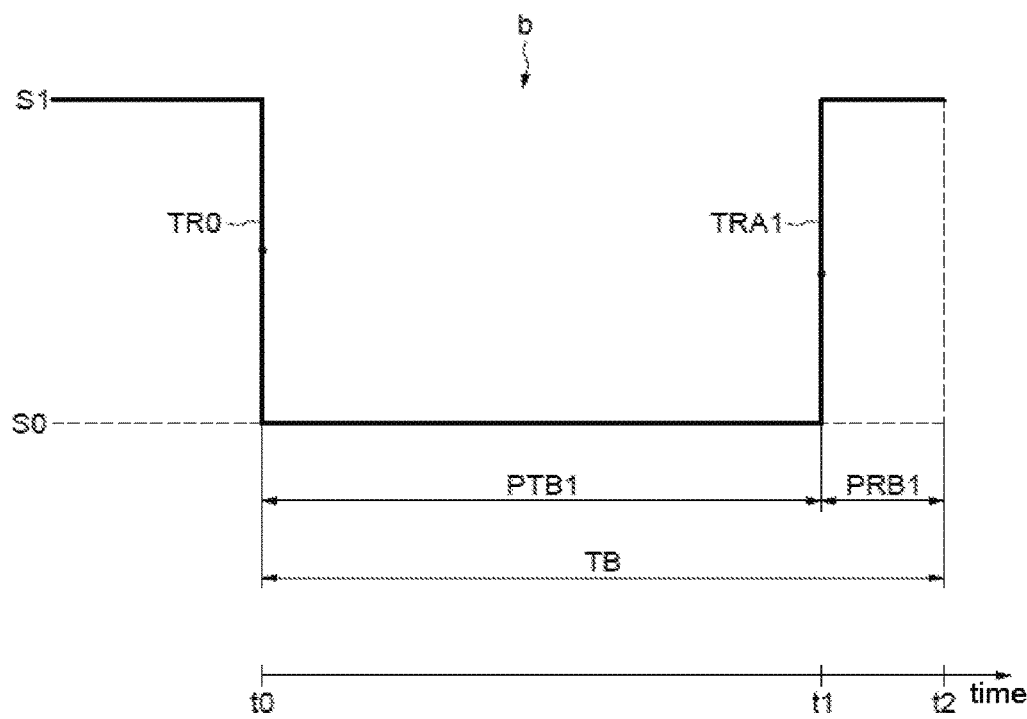

Reference is now more particularly made to FIG. 2 in order to illustrate one embodiment of a method for transmission of a bit b over the serial link.

It is assumed here that the logical value of the bit b is equal to 0 and that the transmission start time to of the bit b corresponds to a falling edge TR0 starting from the steady state S1 (here high state) of the link.

The bit b has a bit time TB.

A first portion PTB1 of the bit time TB equal to αTB is then defined.

The transmission processing unit 10 of the processing unit i then places the serial link in one of its states depending on the logical value of the bit b for the whole of the first portion of bit time PTB1. In the example described here, since the logical value of the bit b is 0, the link is placed in its state S0.

Then, upon the expiration of the portion PTB1, a first additional transition TRA1 is generated over the link so as to place it in its other state, in the present case the state S1, and this lasts up to the expiration of the bit time TB in other words during the portion PRB1 equal to (1−α)TB.

Figure 3:
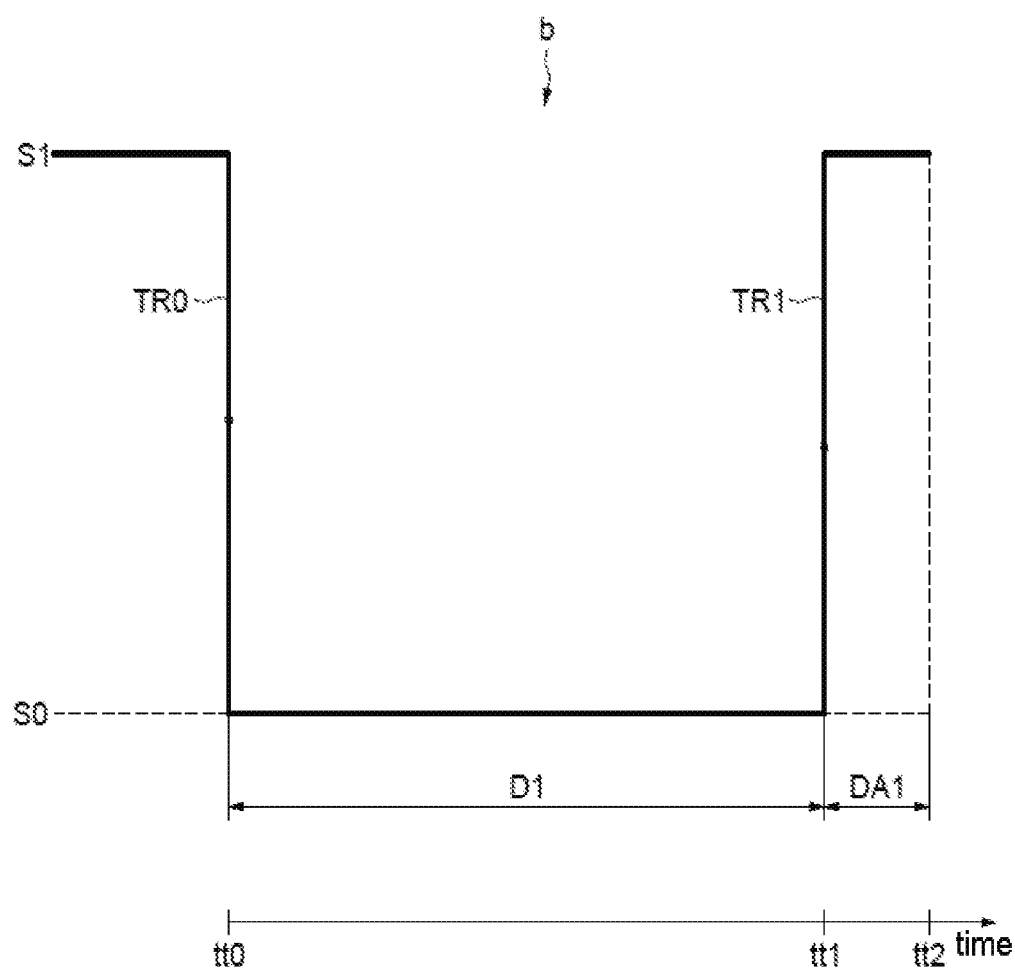

One embodiment of the reception processing of such a transmitted bit is illustrated in FIG. 3.

The reception processing unit 21 of the processing unit 2 knows the value of α.

The reception processing first of all comprises a detection of the time tt0 of the start of reception of the bit b, here typically corresponding to the occurrence of a falling edge TR0 from the steady state S1 of the link.

Then, the occurrence of a first transition TR1 between the two states of the link is detected, here between the state S0 and the state S1, after the time tt0.

This first transition takes place at the time tt1.

The reception processing unit of the processing unit then determines the first period D1 between the times tt0 and tt1.

The reception processing unit is from then on able to determine that the bit time TB of the received bit will be equal to D1/α and that the time tt2 of the end of reception of the bit b will be separated from the time tt1 of occurrence of the first transition TR1 by a first additional period DA1 equal to a first predetermined portion β of the first period D1, in this case defined by the formula (I) hereinbelow:

$$DA1 = \frac{(1-\alpha)}{\alpha} D1 \quad (I)$$

with $\beta = \frac{(1-\alpha)}{\alpha}$.

It can therefore be seen that the use of an additional transition in the transmission phase situated towards the end of the bit time in reception allows the end of the reception of the bit to be anticipated and the bit time to be determined.

So as to reduce the risk of error in the detection of the bit time, it is preferable for the first additional transition TRA1 and, as a consequence the first transition TR1, to be situated sufficiently far from half way through the bit time and the end of the bit time. Those skilled in the art will be able to choose a taking into account these criteria notably as a function of the value of the clock signals used.

This said, by way of example, α may be chosen within the range between 0.6 and 0.9, for example equal to 0.75.

For this reason, β is in the range between 0.11 and 0.66, for example equal to 0.33.

In the examples in FIGS. 2 and 3, the time to of the start of transmission of the bit b and the time tt0 of the start of reception of the bit b have been represented by a falling edge TR0. However, it goes without saying that, depending on the logical value of the bit and/or on the steady state of the link, this transition TR0 could be a rising edge. Furthermore, in the case where several bits are transmitted successively, if the bit b−1 preceding the bit b has a logical value opposite to that of the bit b, then, for the bit b, there will be no transition TR0 following a transition TRA1 (in transmission) or a transition TR1 (in reception) generated during the bit time of the bit b−1. In this case, the time to of the start of transmission of the bit b will be the time of the end of transmission of the bit b−1 and the time tt0 of the start of reception of the bit b will be the time estimated for the end of reception of the bit b−1.

Figure 4:
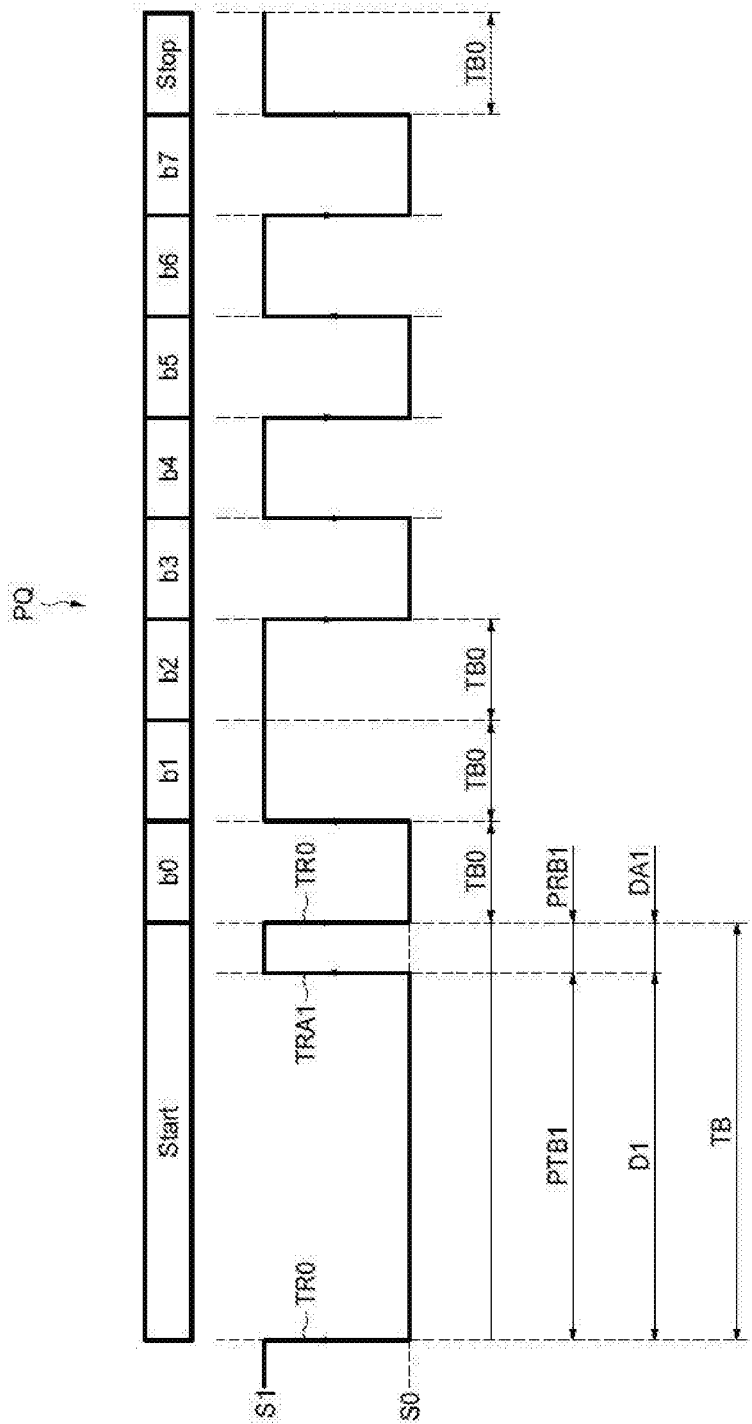

Reference is now more particularly made to FIG. 4 in order to illustrate one embodiment of a method of transmission applicable to a packet PQ of bits.

In the example described here, the packet is a frame of the type UART comprising a first bit referenced "start", which is a start bit followed by eight useful bits of data b0-b7 followed by a final bit referenced "stop".

The transmission processing illustrated in FIG. 2 is applied here only for the first bit start of the packet.

In fact, although it is theoretically possible for the bit time TB of the first bit start to be equal to the bit time TB0 of all the other bits of the packet PQ, it is preferable, so as to minimize the risk of error in the detection of the bit time in reception, for the bit time TB of the first bit start to be longer than the bit time TB0.

In practice, a bit time TB could be chosen to be equal to K times TB0, where K may be an integer or otherwise. K may, in particular, be a multiple N of the bit time TB0, where N may for example be chosen to be equal to 4.

The first additional transition TRA1 is, as indicated hereinbefore, generated upon the expiration of the portion PTB1 equal to αTB.

In reception, the time periods D1 and DA1 are determined as indicated hereinbefore with reference to FIG. 3 and the bit time TB is then equal to D1/α as explained hereinbefore.

Once the bit time TB has been determined, the bit time TB0 can be readily calculated by dividing the bit time TB by N.

Thus, the speed of transmission ("baud rate") is determined.

Nevertheless, the bits b0 at stop could have various bit times but determinable from the bit time TB by a known relationship of the receiver. Thus, each bit time TBi for the bits b0 at stop could be the product of TB with a coefficient $C_i$, $C_i$, being the coefficient associated with the bit of rank i and also known by the receiver. α remains identical for all the bits.

Figure 5:
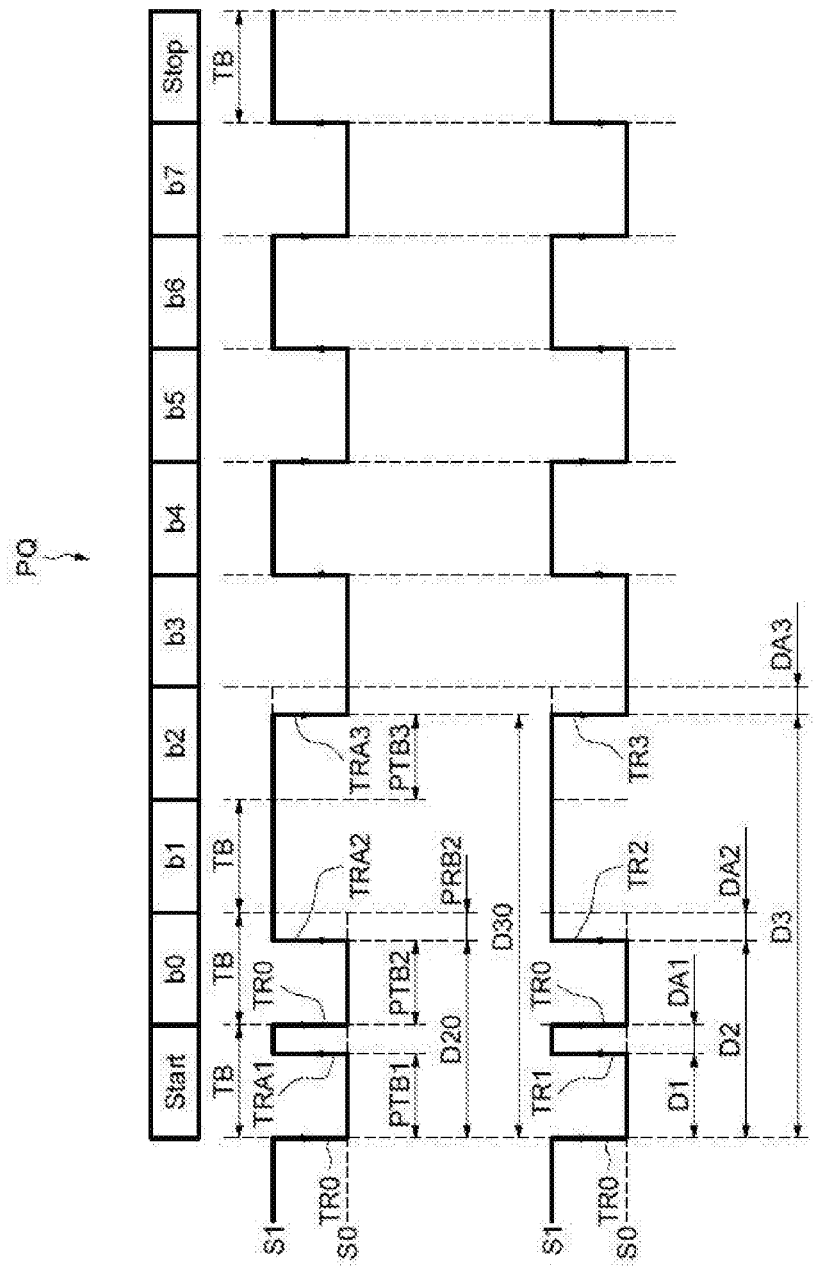

In the example illustrated in FIG. 5, the packet PQ is a UART frame comprising here again a first bit start followed by eight data bits b0-b7 followed by a final bit stop.

In this example, it is assumed that all the bits of the packet PQ have the same bit time as TB.

In this embodiment, so as to reduce the risk of error in the detection of the bit time in reception, and consequently in the detection of the speed of transmission (baud rate), the transmission processing unit will generate an additional transition, not only during the bit time of the first bit start, but also during certain other bits of the packet, in this case the bits b0 and b2.

More precisely, the first transmission processing, such as illustrated in FIG. 2, is applied for the first bit start leading to the generation of the first additional transition TRA1 at the end of the portion PTB1 equal to αTB.

As illustrated in the upper part in FIG. 5, a second transmission processing applied to the bit b0 comprises, starting from the transmission start time of this bit b0 and up to the expiration of a second period D20, which is this time counted starting from the transmission start time of the first bit start, the placing of the link in the state corresponding to the logical value of the bit b0, in this case the placing of the link in the state S0.

Accordingly, the link is placed in this state S0 during a second portion PTB2 of the bit time TB.

Although not indispensable, the duration of the portion PTB2 is preferably equal to the duration of the portion PTB1, for the sake of simplification.

PTB2 is consequently equal to αTB.

The second period D20 is consequently equal to the sum of the bit time TB associated with the start bit and of the second portion PTB2. D20 is therefore equal to (1+α)TB.

Upon the expiration of the second period D20, the transmission processing unit generates a second additional transition TRA2 so as to place the link in its state S1 up to the expiration of the bit time TB associated with the bit b0.

The link is therefore placed in its state S1 during the portion of bit time PRB2 here equal to (1−α)TB.

In view of the generation of the two additional transitions TRA1 and TRA2, the bit time TB will be able to be calculated with sufficient precision so as to be able to forego the generation of another additional transition within the bit b1.

On the other hand, it is preferable to re-generate a third additional transition TRA3 during the bit b2.

This third additional transition TRA3 is generated upon the expiration of a third period D30 again counted starting from the time of the start of the first bit start, this duration D30 being equal to the sum of bit times of preceding bits, in this case here three bit times TB, and of the portion PTB3 which is equal to αTB. D30 is therefore here equal to (3+α)TB.

In reception, as illustrated in the lower part in FIG. 5, the reception processing unit applies, for the first bit start, the reception processing such as that illustrated in FIG. 4, which allows not only the end of reception of the start bit to be determined but also a first determination of the bit time TB to be obtained by applying the formula TB=D1/α.

Then, the reception processing unit applies a second reception processing for the bit b0.

This second reception processing comprises a detection of the occurrence of a second transition TR2 over the link, here making it go from its state S0 to the state S1, after the reception time of the bit b0.

The reception processing unit then determines a second period D2 separating the reception time of the first bit start and the time of occurrence of this second transition TR2.

The reception processing unit can then carries out a new determination of the bit time TB which is equal to:

$$\left(\frac{1}{1+\alpha}\right)D2 \qquad (II)$$

This second determination of the bit time is more accurate than the first which becomes obsolete.

Furthermore, the reception end time of the second bit b0 will be separated from the time of occurrence of the second transition TR2 by a second additional period DA2 which is equal to a second predetermined portion of the second period D2.

More precisely, the second additional period DA2 is equal to:

$$\left(\frac{1-\alpha}{1+\alpha}\right)D2 \qquad (III)$$

The second reception processing is also applied for the fourth bit b2 of the packet PQ.

More precisely, the detection of the third transition TR3 allows the third period D3 to be determined still counted starting from the reception start time of the first bit start.

This allows a new estimation of the bit time TB to be obtained which is supplied by the formula (IV) hereinbelow:

$$TB = \left(\frac{1}{3+\alpha}\right)D3 \qquad (IV)$$

This third determination of the bit time is more accurate than the second which, in turn, becomes obsolete.

The reception end time of the bit b2 will then be obtained at the end of the expiration of the third additional period DA3 which is obtained using the formula (V) hereinbelow:

$$DA3 = \left(\frac{1-\alpha}{3+\alpha}\right)D3 \qquad (V)$$

Whereas in the embodiment in FIG. 5 which has just been described, the bit time TB was identical for all the bits, it could here again be different for at least some of them, or even for all the bits, as long as these bit times are determinable by a known relationship of the transmitter and of the receiver.

More precisely, it may for example be assumed that the bit time of each bit of the packet is equal to GiTBB, where TBB is a constant and Gi a coefficient associated with the bit of rank i in the packet PQ. The coefficients Gi are known by the transmitter and by the receiver, and α remains identical for all the bits but could be different for each bit as long as it is known to the transmitter and receiver.

Thus, taking once again the example in FIG. 5, the period D1 allows the bit time TB1 of the start bit to be determined in reception by the formula TB1=D1/α.

This bit time TB1 is furthermore equal to GiTBB (where G1 is the coefficient associated with the first bit start) which supplies a first determination for TBB equal to D1/(αG1).

A new estimation of TBB can be obtained in reception with the transition TR2 (second bit b0) and the formula TBB=D2/(G2(1+α)).

The bit time TB3 of the third bit b1 can then be determined by the reception processing unit via the formula TB3=G₃TBB.

A new estimation of TBB can be obtained in reception with the transition TR3 (fourth bit) and the formula TBB=D3/(G4(3+α)).

This latter estimation of TBB will be retained for the determination by the reception processing unit of the bit times of the bits b3 at stop using the formula $G_i$TBB.

The embodiment illustrated in FIG. 6 is more particularly adapted when the speed of transmission (baud rate) changes in the course of the communication, and even when it changes for each transmitted bit.

For this FIG. 6, the packet of bits PQ is still a packet of the UART type but this time the bit time of each of the bits may be different.

Accordingly, the application is advantageously provided at the transmission, for each bit to be transmitted, the transmission processing such as that described with reference to FIG. 2 and, in reception, for each bit received, the reception processing such as that illustrated with reference to FIG. 3 by each time taking into account, as explained hereinbefore with reference to these figures, the manner in which the times of the start of transmission of a transmitted bit or of the start of reception of a received bit (absence or presence of a transition TR0) are determined.

In practice, the transmission processing unit will generate an additional transition TRA1 during each transmission of a bit, at the end of the portion PTB1. In the example described, for the purposes of simplification, PTB1 is identical for all the bits since it was assumed that the bit time was equal for all the bits. However, PTB1 could be different for at least some of the bits owing to the difference in the associated bit times. α can remain identical for all the bits but could be different for each bit as long as it is known to the transmitter and receiver.

In reception, the reception processing unit will determine, for each bit, the period D1, the additional period DA1, and will accordingly be able to determine the bit time associated with the bit in question.

The invention is not limited to the embodiments and their implementations which have just been described but encompasses all the variants of the latter.

Thus, although in everything that has been described the transmission or reception start time of the first bit of a packet was determined by the occurrence of a transition of the link starting from its steady state, it is perfectly possible for this transmission or reception start time to be supplied by a signal external to the link.

What is claimed is:

1. A method comprising:
   causing a first transition of a serial link from a first state to a second state, the first transition being cause by a transmitter capable of transmitting at a plurality of different speeds of transmission;
   a first time after the first transition, using the transmitter to cause a second transition of the serial link to the first state; and
   a second time after the second transition, using the transmitter to transmit a plurality of bits through the serial link, wherein the first time indicates a selected speed of transmission, and wherein a bit of the plurality of bits has a first duration based on the first time.

2. The method of claim 1, wherein the first time plus the second time is substantially equal to a start bit time, and wherein the first time is between 60% and 90% of the start bit time.

3. The method of claim 1, wherein the first time plus the second time is substantially equal to the first duration times k, wherein k is a positive integer.

4. The method of claim 3, wherein k is equal to 4.

5. The method of claim 1, wherein each of the plurality of bits has the same duration.

6. The method of claim 1, wherein the first duration is substantially equal to the first time over α, and wherein α is a predetermined factor, the method further comprising:
   detecting a third transition of the serial link from the first state to the second state using a receiver;
   measuring a third time between the third transition and a fourth transition of the serial link from the second state to the first state; and
   a fourth time after the fourth transition, receiving the plurality of bits.

7. The method of claim 6, further comprising determining a duration of a start bit as the third time over α.

8. The method of claim 7, further comprising dividing the start bit over k to determine a duration of a bit of the received plurality of bits, wherein k is a positive integer.

9. A transmitter capable of transmitting at a plurality of different speeds of transmission and configured to be coupled to a serial link, the transmitter comprising at least one processing unit configured to:
   cause a first transition in the serial link from a first state to a second state;
   a first time after the first transition, cause a second transition in the serial link to the first state; and
   a second time after the second transition, transmit a plurality of bits through the serial link, wherein the first time indicates a selected speed of transmission, and wherein a bit of the plurality of bits has a first duration based on the first time.

10. The transmitter of claim 9, wherein the first time plus the second time is substantially equal to a start bit time, and wherein the first time is between 60% and 90% of the start bit time.

11. The transmitter of claim 9, wherein the first time plus the second time is substantially equal to the first duration times k, wherein k is a positive integer.

12. The transmitter of claim 11, wherein k is equal to 4.

13. The transmitter of claim 9, wherein the first duration is substantially equal to the first time over α, and wherein α is a predetermined factor, the transmitter further configured to cause a third transition in the serial link to the first state during transmission of a first bit of the plurality of bits, wherein the third transition occurs (1+α) times the first duration after the first transition.

14. The transmitter of claim 13, further configured to cause a fourth transition in the serial link to the second state during transmission of a third bit of the plurality of bits, wherein the fourth transition occurs (3+α) times the first duration after the first transition.

15. The transmitter of claim 9, further configured to cause an additional transition in the serial link during each bit of the plurality of bits.

16. A receiver configured to be coupled to a serial link, the receiver comprising at least one processing unit configured to:
- detect a first transition of the serial link from a first state to a second state;
- determine a first time between the first transition and a second transition of the serial link from the second state to the first state;
- divide the first time over $\alpha$ to estimate a duration of a start bit, wherein $\alpha$ is a predetermined factor;
- determine a second time based on the first time and $\alpha$; and
- receive a plurality of bits after the second time.

17. The receiver of claim 16, wherein the receiver is further configured to determine a duration of a bit of the plurality of bits by dividing the duration of the start bit over k, wherein k is a positive integer.

18. The receiver of claim 17, wherein k is equal to 4.

19. The receiver of claim 16, wherein $\alpha$ is between 0.6 and 0.9.

20. The receiver of claim 16, wherein the plurality of bits have the same duration.

21. The receiver of claim 16, further configured to:
- determine a third time between the first transition and a third transition of the serial link to the first state, wherein the third transition occurs during reception of a first bit of the plurality of bits;
- generate a second estimate of the duration of the start bit by dividing the third time over $(1+\alpha)$;
- determine a fourth time based on the third time; and
- after the fourth time, receive a second bit of the plurality of bits.

22. The receiver of claim 21, further configured to:
- determine a fifth time between the first transition and a fourth transition of the serial link to the second state, wherein the fourth transition occurs during reception of a third bit of the plurality of bits;
- generate a third estimate of the duration of the start bit by dividing the fifth time over $(3+\alpha)$;
- determine a sixth time based on the fifth time; and
- after the sixth time, receive a fourth bit of the plurality of bits.

23. The receiver of claim 16, further configured to:
- determine, for each bit, a respective first bit time portion extending between a start of a respective bit and an additional transition occurring during the respective bit; and
- determine a respective second bit time portion extending from the additional transition based on the first bit time portion and $\alpha$.

* * * * *